United States Patent [19]
Chen et al.

[11] Patent Number: 5,914,710
[45] Date of Patent: Jun. 22, 1999

[54] CORDLESS POINTING INSTRUMENT FOR GRAPHICS TABLET

[75] Inventors: Chien-Hung Chen; Jung-Chih Hsu; Che-Wei Hsu, all of Hsin Tien, Taiwan

[73] Assignee: Ace Cad Enterprise Co., Ltd., Hsin Tien, Taiwan

[21] Appl. No.: 08/914,750

[22] Filed: Aug. 20, 1997

[51] Int. Cl.[6] .................................................. G09G 5/00
[52] U.S. Cl. ........................ 345/179; 345/173; 178/19.04
[58] Field of Search .................................. 345/173, 174, 345/179, 183, 182; 178/18.01, 18.03, 18.05, 18.06, 18.07, 18.1, 19.01, 19.03, 19.04, 20.04

[56] References Cited

U.S. PATENT DOCUMENTS

| | | | |
|---|---|---|---|
| 5,128,499 | 7/1992 | Morita | 178/18.07 |
| 5,220,324 | 6/1993 | Morita | 178/20.04 |
| 5,247,138 | 9/1993 | Landmeier | 178/20.04 |
| 5,557,076 | 9/1996 | Wieczorek et al. | 178/18.03 |

*Primary Examiner*—Xiao Wu
*Attorney, Agent, or Firm*—Dougherty & Troxell

[57] ABSTRACT

The present invention is related to a tablet using a cordless pointing instrument, wherein the position of a pointing instrument, in general a pointing pen, in a predetermined line grid is converted into a digital number, meanwhile, the operation of the pointing pen is transferred to the inducing tablet.

2 Claims, 10 Drawing Sheets

CORDLESS POINTING INSTRUMENT FOR GRAPHICS TABLET

BACKGROUND OF THE INVENTION

1. Field of the Invention

The present invention is related to a tablet using a cordless pointing instrument, especially, to a tablet using a passive cordless pointing instrument, and any battery is not required within the cordless pointing.

2. Description of the Prior Art

In the prior art, the pointing instrument of a tablet using electromagnetic induction is installed with a coil and a capacitor to form a resonant circuit. In the active pointing instrument, a battery is needed for the resonant circuit to generate an alternating current signal which may be emitted through a coil, and a sense line grid is located under the tablet for inducing the emitted signal and then the precise position of the pointing instrument may be determined.

For example, in U.S. patent application Ser. No. 5,247,138, a logic circuit is located on the pointing pen for encoding the switch state as a 9 bit number, wherein a further controlling circuit for controlling said resonant circuit is employed so that the alternating current signal may stop transmitting for a while. Through this circuit, the emitted signal may be changed, for example, the number "1" represents as emitting signal continuously for a predetermined time, while the number "0" represents as emitting signal just half of the predetermined time, and stop emitting in the rest half predetermined time. Therefore, said 9 bit numbers may be sequentially emitted by this modulation method and then they are demodulated and decoded into a number representing the switch state, then said tablet can determine the switch state on the pointing instrument.

In the prior manufacturing method, which the passive pointing instrument is used, a coil and a capacitor is also used to form a resonant circuit, but it is needless to use any battery. On the tablet, there is a first set of parallel conducting wire to emit an alternative signal The resonant circuit in the pointing instrument will resonate with said alternative signal, the received energy may be further emitted, and a second parallel conducting wire set which overlaps on the first conducting wire set for receiving the signals emitted by the resonant circuit within the pointing instrument so to determine the precise position of the pointing instrument, since the second parallel conducting wire set is orthogonal to the first parallel conducting wire set, therefore, it will not receive the induced signal emitted by the first conducting wire set.

In U.S. patent application Ser. No. 5,220,324, a resistor and a capacitor within the passive pointing instrument are connected in serial. The capacitor in the resonant circuit is connected with said combination of said resistor and capacitor in parallel. A set of switch is used to select some predetermined resistors which connect with said resistor for changing the combined resistance. Therefore, as the resonant circuit has received the alternating current signal from the first set of parallel conductors, since the resistor will be varied, the tuning frequency of the resonant circuit will change and if the signal is further emitted to the second set of parallel conductors, the phase thereof will be changed. Thus in the tablet, a phase detecting circuit may be used to detect the phase difference between the induced signal on the second set of parallel conductors and the emitted alternating current signal. The phase difference represents the added resistor, i.e. the number of switches that are pressed by the user.

In summary, there are some disadvantages in the U.S. Pat. No. 5,247,138:

1. The battery is needed to operate within the pointing instrument, thus the weight must be increased and the battery life is also limited.

2. A complicated modulating and encoding circuit are required, especially, if the switch input is an analog signal, for example the pressure sensor on the pen tip, then an analog to digital converter will be employed, therefore, the power consumption is getting so high and the battery life will shorten.

3. Since the data transmitting timing on the pointing instrument is not synchronous with the position scanning timing of the tablet. Thus it is possible that when the tablet is inducing the signal for determining the pointing instrument position, the emitted signal may be intermittent because the data transmitting. Thus the induced signal will not be steady, of course the determined position of the pointing instrument is also unstable.

Another drawback in the U.S. Pat. No. 5,247,138 is that in general a metal plate is installed under the tablet for shielding the external noise. But if the pointing instrument is located on the tablet when using, it will close to said metal plate, but once the coil is near the metal plate, the inductance of the coil thereof will change. Therefore, even if the switch has not pressed, once it is close to the metal plate, the phase of the receiving signal will vary which depends on the distance. Although in the patent application, by employing a lookup table, the induced signal may be used to correct the phase. But in practical manufacturing, the material of the material plate and coil, and the tightness of the coil has large effect, thus they are needed to match with each other so to meet the original designed look up table in the ROM. Therefore, in manufacturing, many variable factors are generated, thus multiple correction operations are needed, so it is hard to do the mass production.

SUMMARY OF THE INVENTION

Accordingly, there are many defects in the prior tablet. Therefore, the inventor of the present invention has studied for improving the prior tablet by his plentiful experience and a tablet using a passive cordless pointing instrument is invented, while any battery is not required in the passive cordless pointing instrument.

The present invention will be better understood and its numerous objects and advantages will become apparent to those skilled in the art by referencing to the following drawings in which:

DETAILED DESCRIPTION OF THE PREFERRED EMBODIMENT

Figure 1:
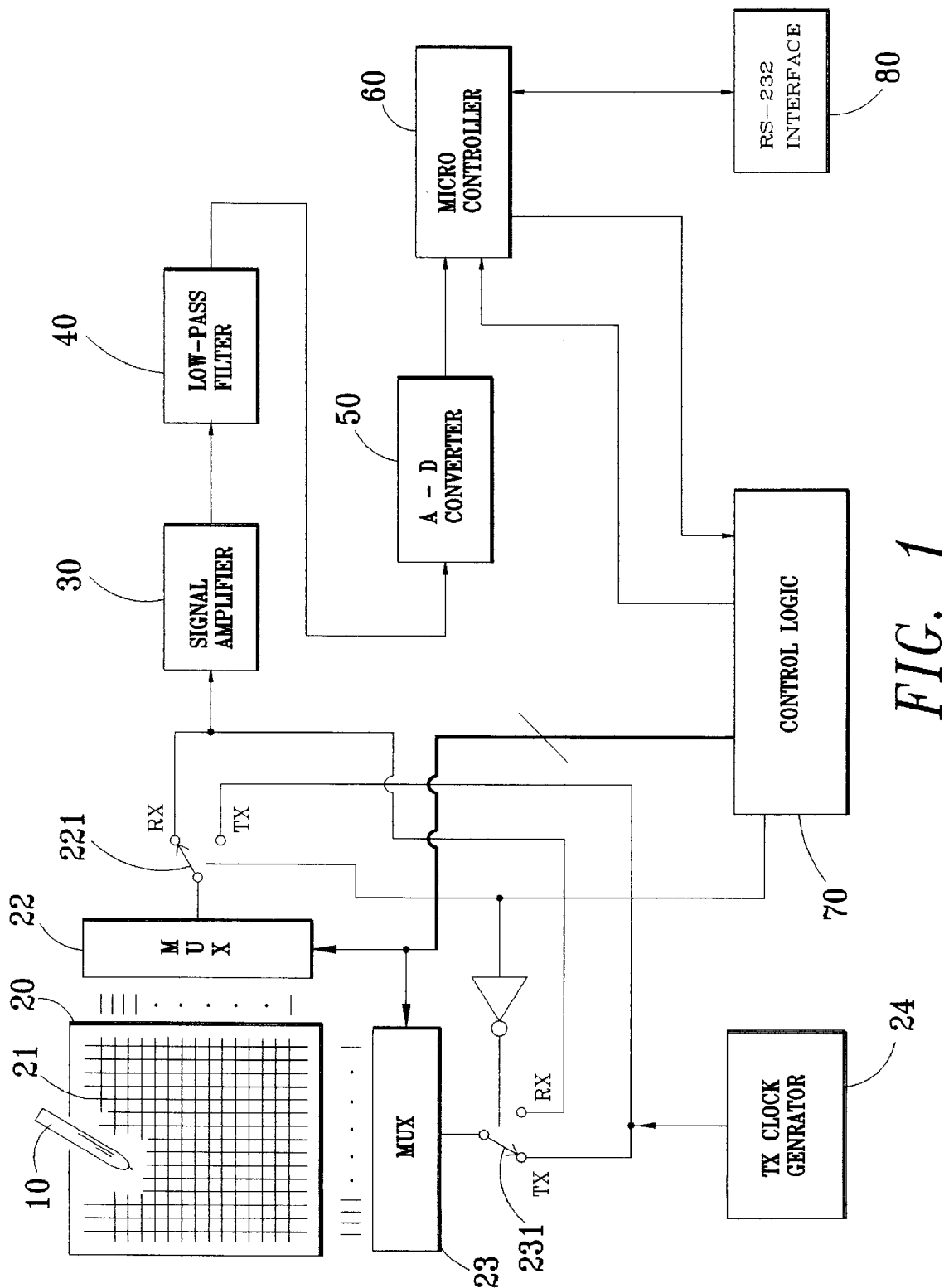
FIG. 1 is a practical way of a tablet using a cordless passive pointing pen.

The practical way and working condition of a tablet using a cordless pointing pen are shown in FIG. 1. On the surface of the tablet 20, there are two sets of spaced parallel conducting wires which are orthogonal overlapped with each other so to form a sense line grids 21, meanwhile, two set of multiplexers 22 and 23 are connected with said two sets of spaced parallel conducting wires. In each set of conductors, only one conductor is selected each time to transmit signal or receive signal Another two sets of switches 221 and 231 are used to switch said two sets of parallel conductors to transmit signals or receive signals. The actions of the two sets of parallel conductors are reciprocal, if one set is transmitting signals, then the other set is receiving signals. Further, a transmitting signal generating circuit 24 is used to generate a alternating current frequency with a intermittent predetermined frequency. Through multiplexers 22 and 23, the signals are connected to set conducting wire set for transmitting.

Figure 2:
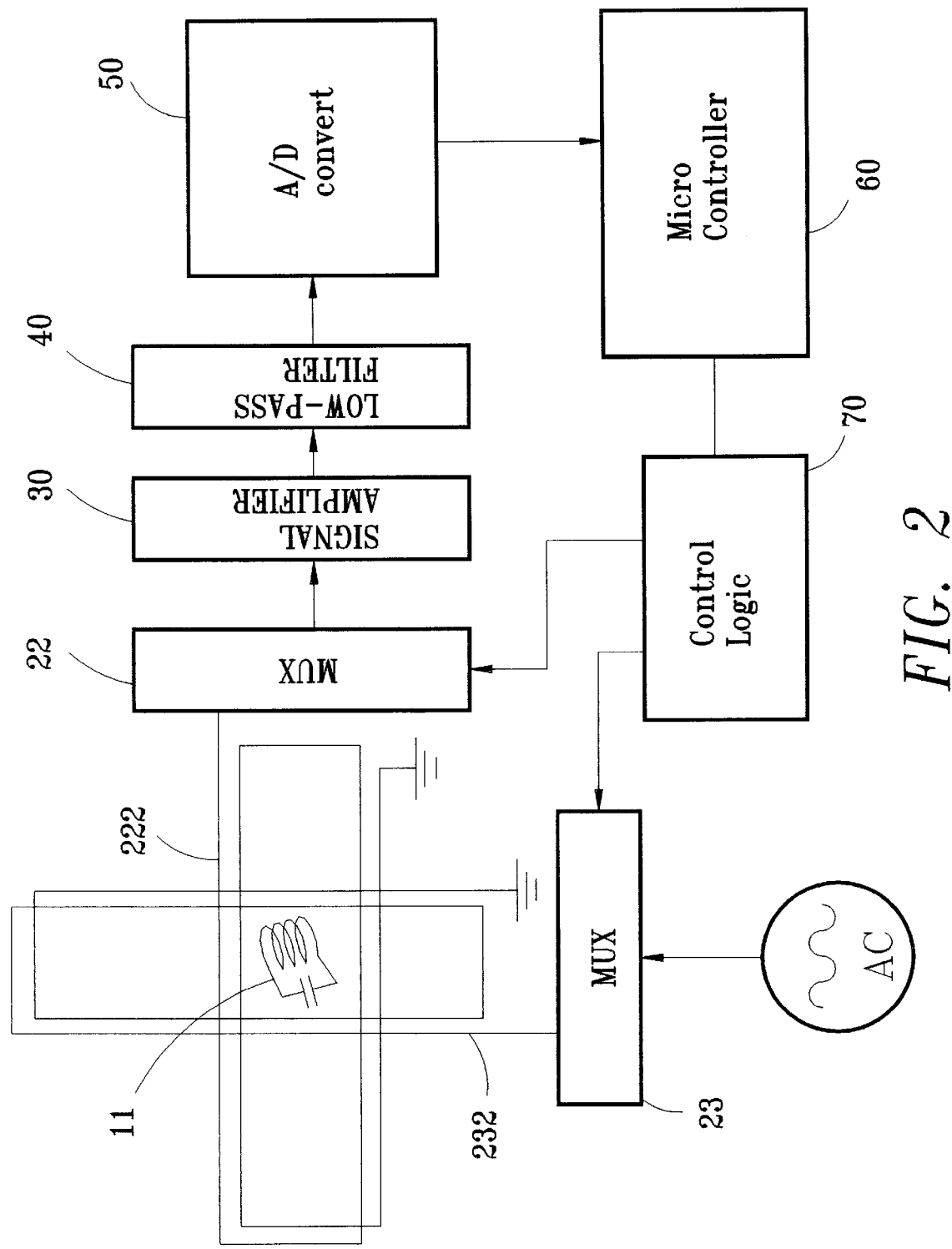
FIG. 2 is a simplified view of FIG. 1 for describing the transmitting and receiving of the alternating current signal by conducting wire sets.

Since in one same conductor set, only one conductor is selected each time which is adjacent to the cordless pointing instrument 10 through the multiplexers 22 and 23 to transmit signal or receive signal Thus in this description, the conducting wire set is simplified to become a single conducting wire, as shown in FIG. 2. After the alternating current signal with predetermined frequency is transmitted through a first conducting wire 232, since the second conducting wire 222 is orthogonal to the first conducting wire 232, thus the two set of conductor will not induce with each other, while the resonant circuit 11 within the cordless pointing instrument 10 is mutually induced with the transmitted signal of the first conducting wire, and the second conducting wire 222 will further mutually induce with the pointing instrument 11 of the cordless pointing instrument.

Figure 3A:
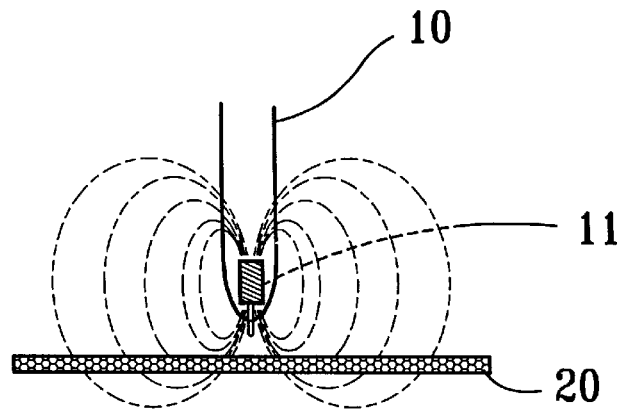
FIG. 3A shows the working condition of a passive pointing pen on the tablet.

FIG. 3(A) shows the working condition of a passive pointing pen 10 on the tablet 20.

Figure 3C:
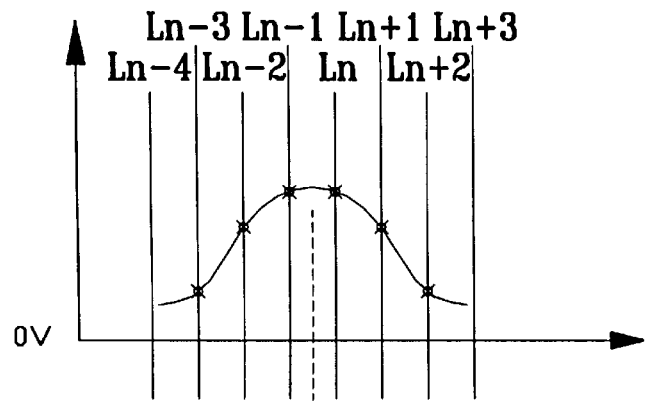
FIG. 3C is a graph illustrating the induced signal for various locations.
Figure 3B:
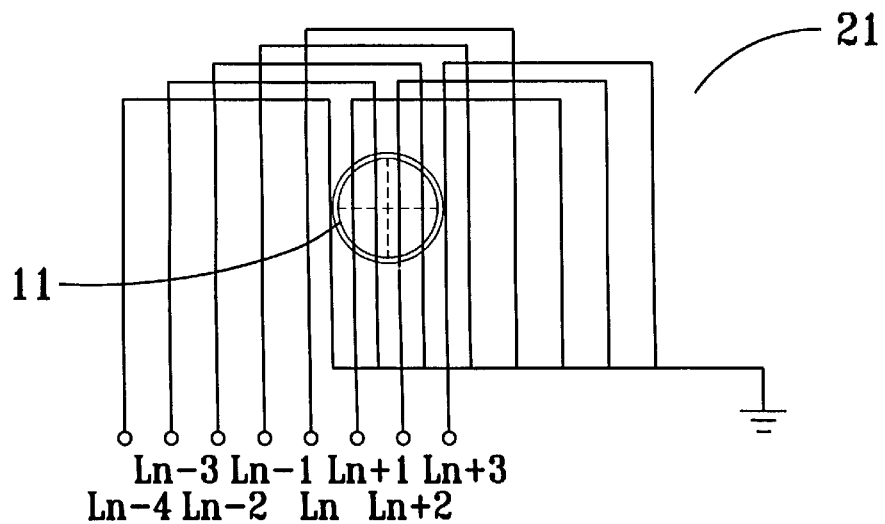
FIG. 3B shows the condition that the resonant circuit within the cordless pointing pen on the tablet.

FIGS. 3(B) and 3(C) show the condition that the resonant circuit 11 within the cordless pointing pen 10 on the tablet 20. Each of the conducting wire is formed by at least a forward conducting wire and a backward conducting wire. If in said sense line grid, the induced signals are scanned sequentially, it is realized that the conducting wire (Ln-1, Ln) which is close to the center of the coil will has a larger induced signal Now referring back to FIG. 1, the induced alternating current signal on the second conducting wire set 222 will input to a signal amplifier 30, and the output thereof will further input to a rectifier and filter circuit 40, thus a voltage corresponding to the amplitude of the induced alternating current signal are obtained, and the voltage is further input to an analog to digital converter 50, therefore a value representing the amplitude of the induced alternating current signal are obtained. Another microprocessor 60 is used to sequentially select each of the conductors of the first conductor set 231 through a controlling logic circuit for transmitting signal, meanwhile, to sequentially select the induced signal of each conductor in the second conductor set so to obtain said amplitude value thereof. The induced signal with maximum amplitude may be identified that the cordless pointing instrument 10 is located adjacent to the conductor having said maximum amplitude. Moreover, the signal amplitudes from some conductors adjacent to the conductor with maximum amplitude are obtained, then a polynomial function which meet said signal amplitudes is obtained. Then we can solve this polynomial function i.e. to get the X value with the maximum Y in the polynomial function, that X value is the position of said cordless pointing instrument, and then the obtained position is transmitted to a host computer by a RS232 interface 80, as shown in FIG. 3.

Figure 4A:
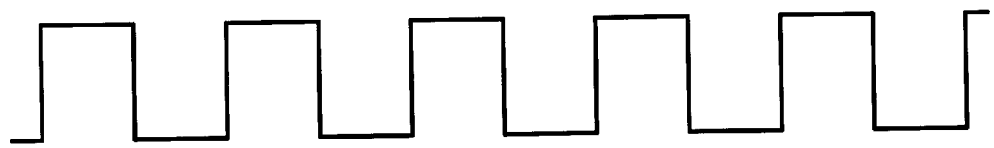
FIGS. 4A–F show the signal timing of the signals generated in the present invention.
Figure 4B:
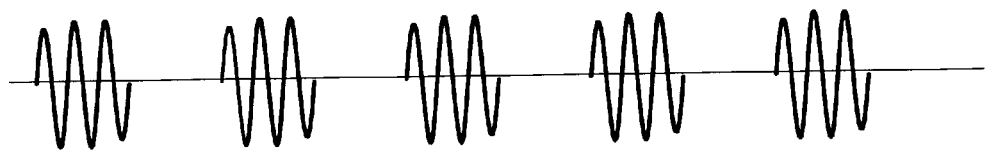
Figure 4C:
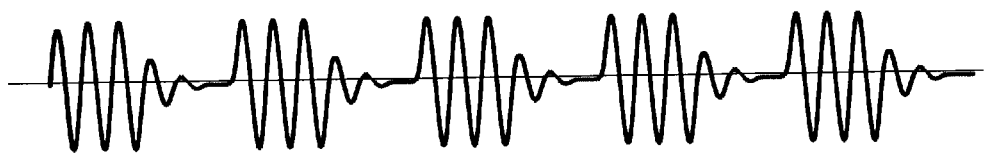
Figure 4D:
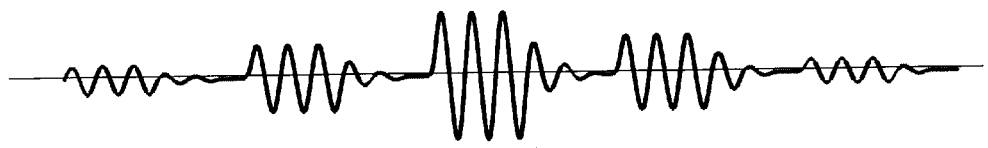
Figure 4E:
Figure 4F:
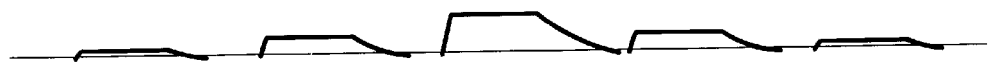

In said operations, we may refer to the FIGS. 4A–4F for the timing of signals. FIG. 4A illustrates a basic scanning frequency period, it is used to control a control logic circuit 70, and then through multiplexers 22 and 23, to sequentially select each of the conductor in the second conductor set 222 which is set to the receive signal. The second signal illustrated in FIG. 4B is emitting signal from the signal generating circuit 24, wherein the generated intermittent alternating current signal synchronous with the scanning period is also the signal transmitted from the first conducting wire set 232. The signal in FIG. 4B is measured on the resonant circuit 11 of the pointing instrument 10. FIG. 4D illustrates the induced signal on the second conducting wire set 222. It is realized that the amplitude of the signal is depend on the distance between the pointing instrument 10 and the conductors. The conductor adjacent to the pointing instrument 10 will induce a maximum amplitude signal The signal amplitudes in FIGS. 4E and 4F are obtained by amplifying, rectifying, and filtering the signal of FIG. 4D. Then the signals are input to the analog to digital converter 50, and a smooth section is selected to convert into a value, finally this value is processed by a microprocessor 60 to determine the precision position 10.

Figure 5:
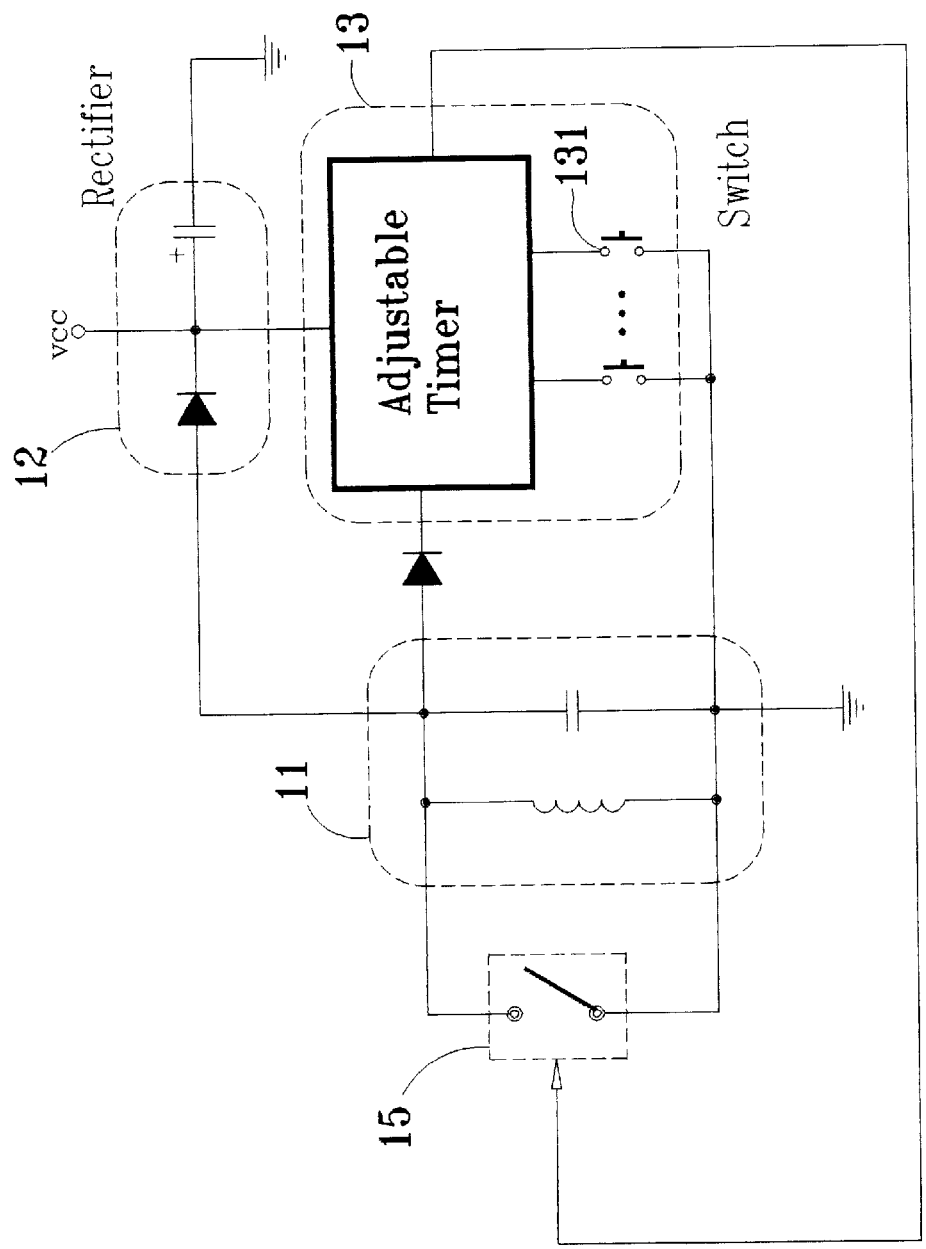
FIG. 5 is the block diagram of a cordless pointing pen.

By said procedures, the position of the cordless pointing instrument 10 on the sense line grids 20 are determined. Furthermore, it is required to know the state of the switch set on the cordless pointing instrument 10 or the pressure strength on the pen tip of the cordless pointing pen 10. FIG. 5 is the block diagram of the cordless pointing instrument 10, the main component is the resonant circuit 11. When the resonant circuit 11 is mutually induced with the signal transmitting conductor to induce the energy, it can be converted into a DC voltage Vcc through a rectifier 12 so to store in a capacitor C as the power source of the other components. Another, as a time adjustable timer 13 receives a trigger signal, it may generate a pulse after delaying an adjustable time. The delay time is determined by the state of the key switch set 131. In the aforementioned description, we ever disclose that the emitted signal is an intermittent signal and the intermittence is the same frequency for switching the conductors during scanning. That is to say, every time the receiving conductor is changed, an alternating current signal is emitted through the emitting conductor, after a period of time, the emission will be stopped, and after a period of time, it is switched to another conducting wire, then the signal is started to emit, thus the operation is continuous repeatedly.

Thus the trigger signal is derived from the start point of every signal emitting period and is used to trigger said timer 13, after a period of time, a pulse is generated to control an analog switch 15. The analog switch is shorted so to immediately discharge the energy of the resonant circuit 11 and then it will not induce energy from the emitting conductor, therefore, the receiving conductor will not induce any signal. By the described property, other than amplitude variation, the induced signal on the receiving conductor set is further varied with time. Thus in the receiving end, the position of the cordless pointing instrument 10 which is determined by the amplitude. Therefore, the condition of the switch set 131 on the pointing instrument 10 will be determined from the time period.

Figure 6A:
FIGS. 6A–6G and 7A–7E show the signal timing generated in the present invention.
Figure 6B:
Figure 6C:
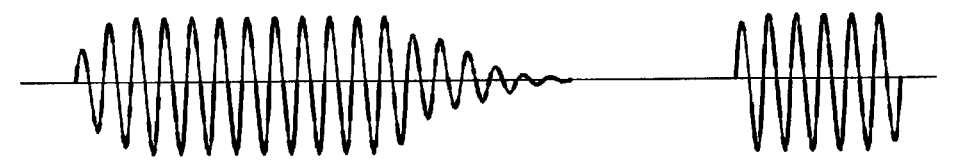
Figure 6D:
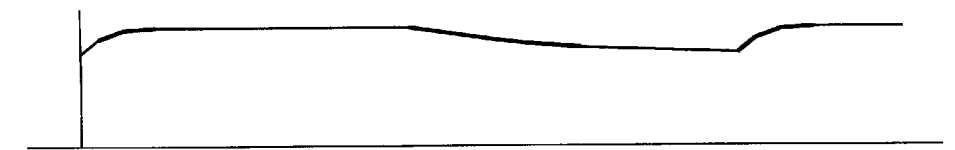
Figure 6E:
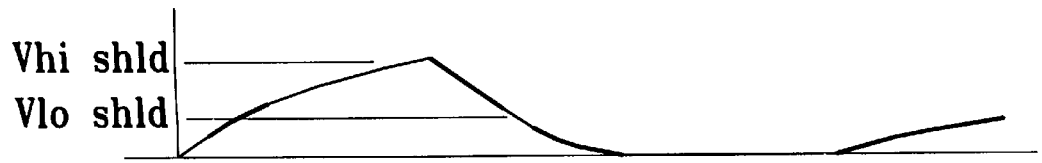
Figure 6F:
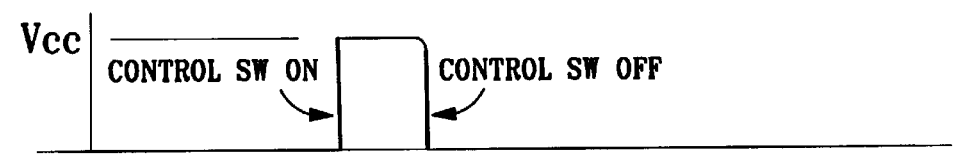
Figure 6G:
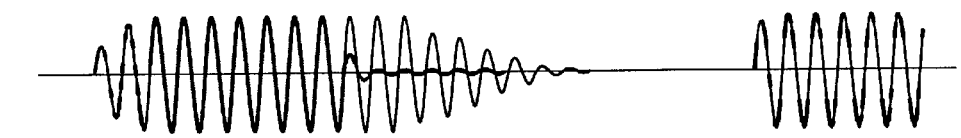

Now referring to FIGS. 6A–6G, it describes said action. In FIG. 6A which is the same as said signal in FIG. 4A is a scanning control frequency, while the signal in FIG. 6B which is the same as said signal in FIG. 4B is the intermittent alternating current signal synchronous with the scanning period. In FIG. 6C is the induced signal measured on the resonant circuit 11 of the cordless pointing instrument 10. The Sig.I we can see here is assumed that the energy discharging has not been performed by the analog switch 15. As the induced signal passed through the rectifier 12 of FIG. 5 and then input to a filter, then Sig. J of FIG. 6D is generated, which is a DC voltage. As an emitting period is begun the induced signal is input to a timer 13, according to the depressing state of the switch set 131 on the cordless pointing instrument 10, the timer will start action by charging a capacitor through resistors. As the charging voltage reaches a critical value, a digital HIGH signal will be generated as Sig. L in FIG. 6F. The HIGH signal will turn on the analog switch 15 so that the energy within the resonant circuit 11 will be discharged immediately as Sig. M in FIG. 6G. Since the energy within the resonant circuit 11 is discharged, the counter 13 will lose input signal, then the timing capacitor will start to discharge. In the discharging process, as the voltage is reduced to another predetermined voltage, a digital low signal is generated, thus the counter 13 will be reset.

Figure 7A:
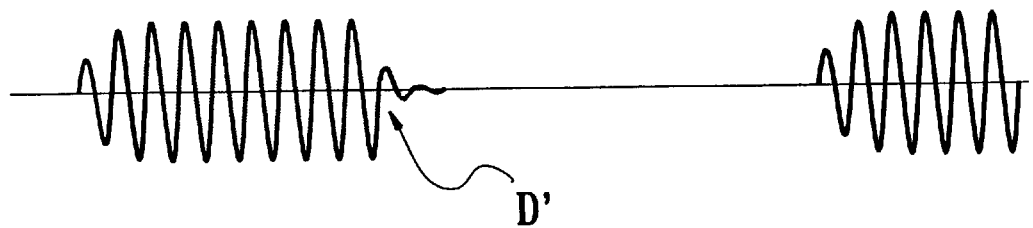
Figure 7B:
Figure 7C:
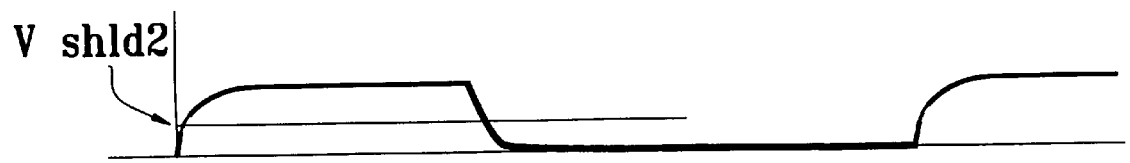
Figure 7D:
Figure 7E:

Now referring to FIGS. 7A–7E, Sig. N in FIG. 7A is an alternating current signal which is received by the receiving conductor, wherein in the D' point, the energy within the resonant circuit 11 is discharged completely, and no further signal will be received. As the induced receiving signals pass through a rectifier and filter circuit 40, the Sig. O (FIG. 7B) and Sig. P (FIG. 7C) may be derived. Then they are compared with a predetermined voltage by a comparator, then the Sig. Q of FIG. 7D is obtained which is used to control a counter which is counting in a predetermined frequency. Therefore, the result of count value represents the status of switch set 131 of the cordless pointing instrument 10 or the pressure strength on the pen tip of the cordless pointing pen 10.

Figure 8:
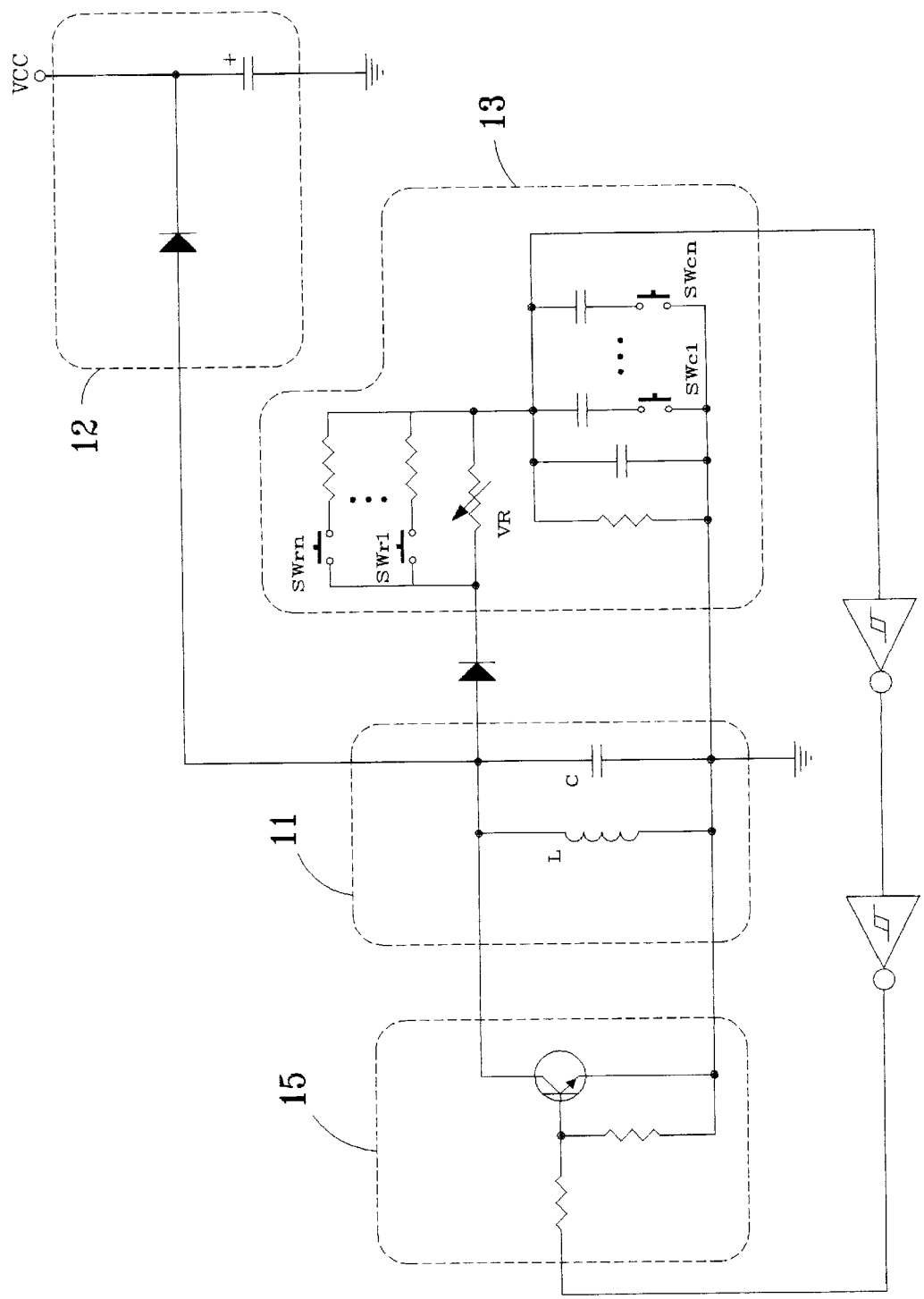
FIG. 8 is the circuit diagram of the present invention.

FIG. 8 shows the practical circuit of the cordless pointing pen 10 in the present invention, wherein VR is a instrument the resistor of which may be varied by applying pressure, as a pressure is applied, the resistance will be reduced by the increasing of the pressure. SWr1 to SWrn consists of a plurality of switch, and the more the number of pressed switches, the smaller the total resistance. SWc1 and SWcn are also constructed by a plurality of switch, as the more the number of pressed switches, the larger the total capacitance. Therefore, the charging time of the timer 13 will be changed according to the pressure and switch condition, while the analog switch 15 is a transistors.

Figure 9:
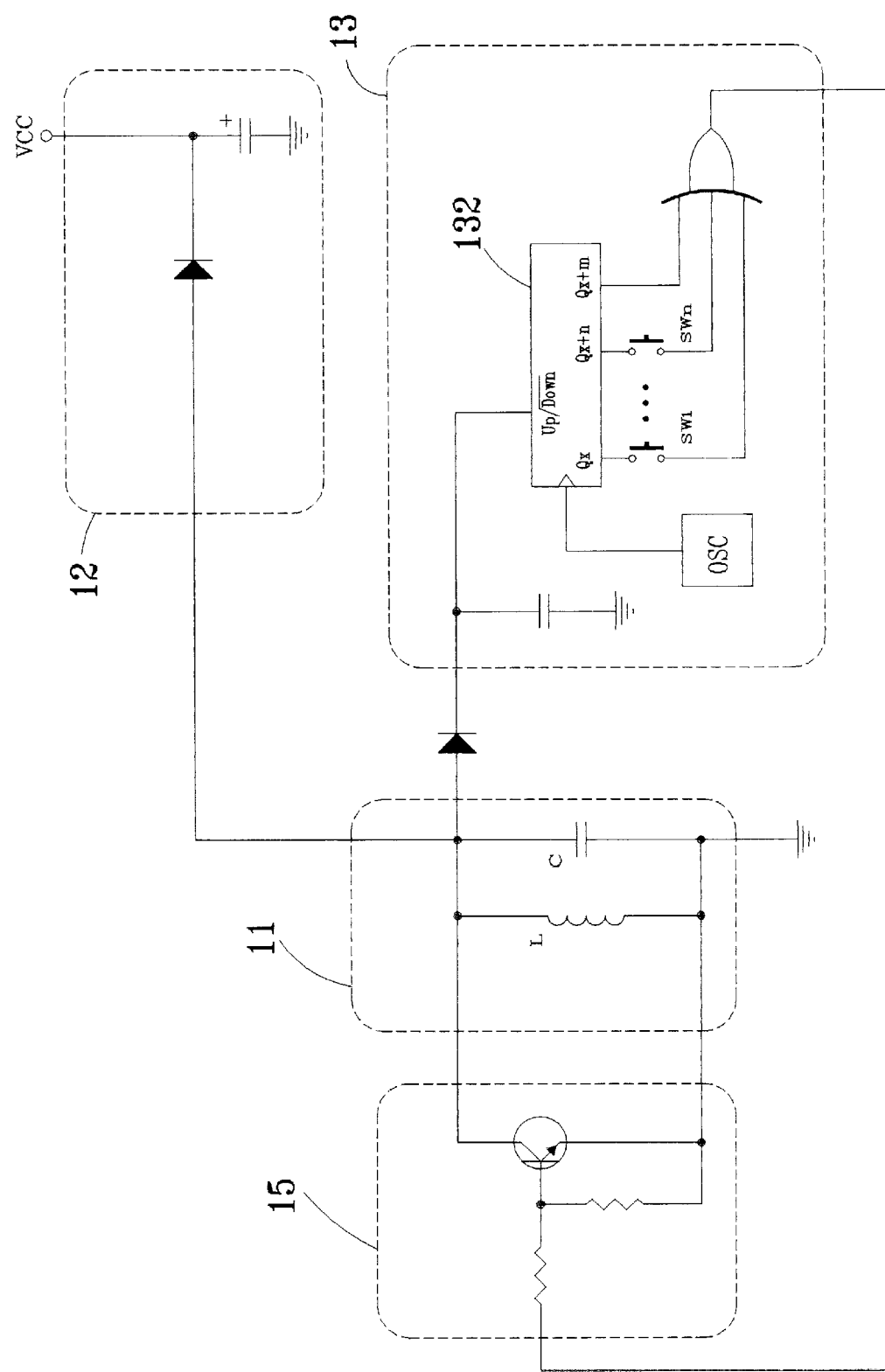
FIG. 9 is another practical circuit of the cordless pointing pen in the present invention.

FIG. 9 shows the another practical circuit of the cordless pointing pen 10 in the present invention, which is substantially the same as that of FIG. 8, only the counter 13 is changed to a digital counter. OSC is a clock generator with predetermined frequency which is input to a counter 132 which divides by N and may count up and down. As the resonant circuit 11 receives the emitting signal, a HIGH signal will input to counter 132, and the counter starts to count increasingly. Qx to Qx+m are the overflow outputs which represents the predetermined frequency divided by N, and output HIGH signal when overflow occurred. For example, the Qx is high when divides by 256 overflow occurred, the Qx+1 is high when divides by 266 overflow occurred, and the Qx+2 is high when divides by 276 overflow occurred, etc. Therefore, if the user does not push button, then it will wait until the last Qx+m is generated, the OR gate will output HIGH signal, thus the analog switch is turned on thus the energy of the resonant circuit 11 will be discharged. After the energy of the resonant circuit 11 is discharged, a low voltage signal will input to the counter 132 so that the counter will count down until it is reset to zero, and then it is started to wait the action of the following cycle. If the user has pushed the button, then the analog switch 15 will be turned on earlier, therefore it is the similar function as that in FIG. 8.

Figure 10:
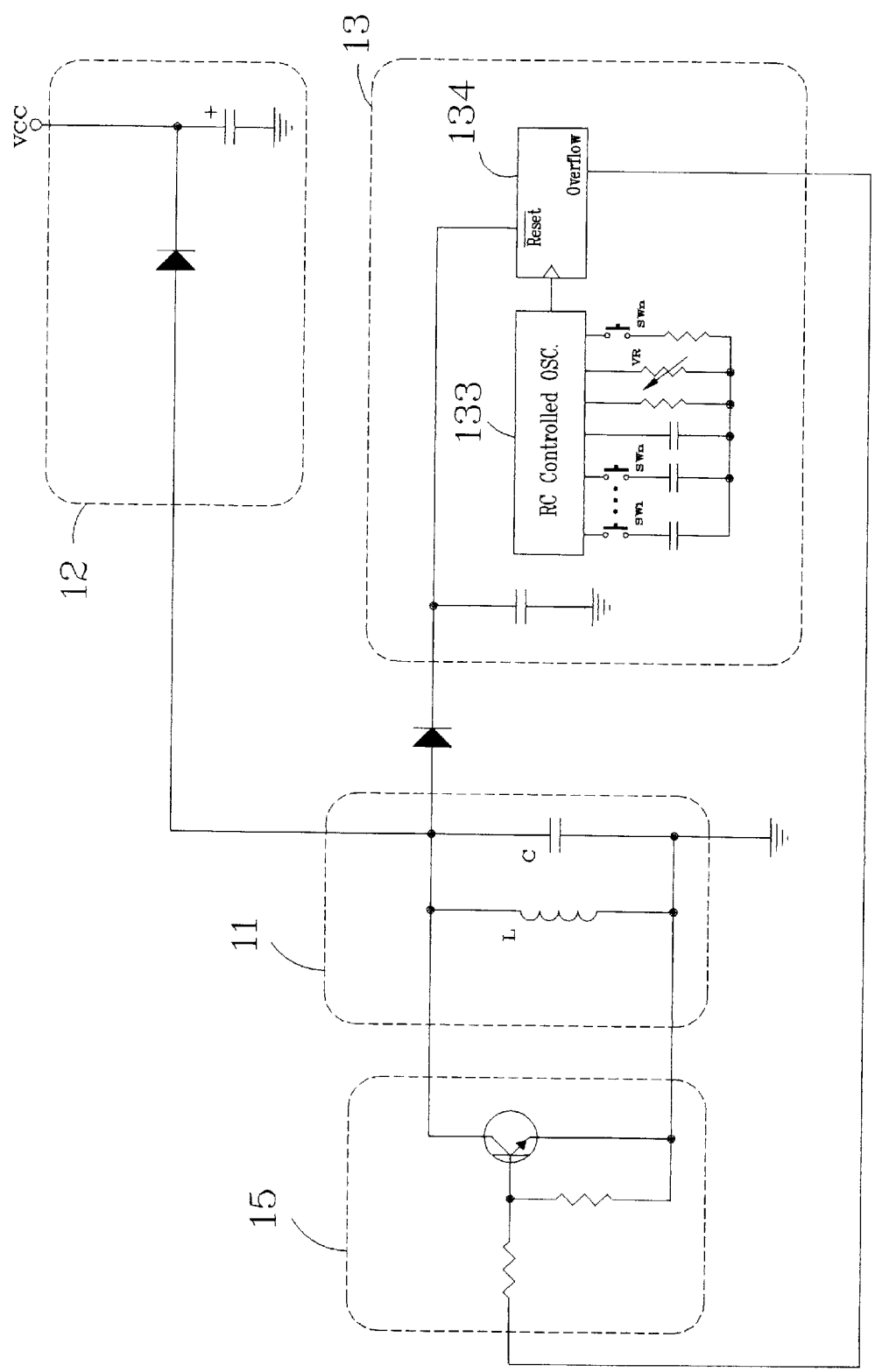
FIG. 10 is another practical circuit of the cordless pointing pen in the present invention.

FIG. 10 shows the another practical circuit of the cordless pointing pen 10 in the present invention, wherein the circuit in the FIG. 9 is further improved, in which a RC controlling oscillator 133 is used to generate a counting frequency. In the oscillating frequency, an external switch set is employed to control the total resistance and total capacitance, and further to control the frequency of the oscillator 133. Wherein VR is a pressure sensor that the resistance may varied due to the applied pressure force which also will affect the total resistance. Next the counter 134 will generate an overflow output for dividing by N, which is a HIGH signal, so to turn on the analog switch Another, as the resonant circuit 11 has received the emitted signal, a HIGH potential will input to counter 134 so that the counter may leave the reset condition and start counting up with a predetermined frequency until an OVERFLOW signal is generated. Which will turn on the analog switch 15 and the energy within the resonant circuit 11 is discharged. If the energy within the resonant circuit 11 is discharged, the counter 134 will get a LOW signal input, so that the counter 134 will be in the Reset condition so the OVERFLOW output will also be cleared and retain in the reset condition until the next emitting period is started. Therefore, as the user pushes buttons or changes the pressure on the pen tip, similarly, the time to discharge the energy within the resonant circuit 11 may vary and the same function as shown in FIG. 8 is achieved.

Although certain preferred embodiment of the present invention has been shown and described in detail, it should be understood that various changes and modification may be made therein without departing from the scope of the appended claims.

What is claimed is:
1. A tablet using a cordless pointing instrument comprising:
 a) an inducing instrument having a set of transmitting spaced parallel conductors for transmitting an alternating current signal; a set of receiving parallel conductors arranged orthogonally to the set of transmitting con- ductors and overlapping the set of transmitting conductors for receiving an induced signal; a first multiplexer for selecting any conductor of the transmitting conductor for transmitting said alternating current signal; a second multiplexer for selecting any conductor of the receiving conductors for receiving the induced signal; and a signal processing circuit connected to the set of receiving conductors to convert the induced signal in a location value;

b) a cordless pointing instrument having: a resonant circuit receiving the alternating current signal from the set of transmitting conductors and for emitting a signal inducing the induced signal in the set of receiving conductors; an adjustable timer located in the cordless pointing instrument and connected to the resonant circuit such that the adjustable timer commences counting upon receipt of the alternating current signal by the resonant circuit; a first switch device connected to and controlled by the adjustable timer such that, when the first switch device is closed, the resonant circuit ceases emitting a signal; and a second switch device connected to the adjustable timer and the first switch device, such that the length of time counted by the adjustable timer is controlled by the second switch device whereby the length of time the resonant circuit emits a signal is representative of the state of the second switch device; and c) a processor unit connected to the first and second multiplexers and the signal processing circuit to determine the position of the cordless painting instrument relative to the inducing instrument.

2. The tablet using a cordless pointing instrument of claim 1, wherein said second switch device further comprises at least one analog sensor on the cordless pointing instrument to detect a change in external pressure on the cordless pointing instrument and to vary the length of time counted by the adjustable timer in relation to the external pressure.

* * * * *